United States Patent

Busch et al.

[11] Patent Number: 5,984,286
[45] Date of Patent: Nov. 16, 1999

[54] APPARATUS FOR THE HEIGHT-ADJUSTABLE SUPPORT OF A WHEEL OR AN AXLE ON A VEHICLE BODY

[75] Inventors: Werner Busch, Weinstadt; Günter Nagel, Esslingen, both of Germany

[73] Assignee: Daimler Chrysler AG, Stuttgart, Germany

[21] Appl. No.: 08/911,152

[22] Filed: Aug. 14, 1997

[30] Foreign Application Priority Data

Aug. 16, 1996 [DE] Germany ........................... 196 32 805

[51] Int. Cl.[6] .................................................. B60G 13/00
[52] U.S. Cl. ............................................ 267/218; 267/177
[58] Field of Search ................................. 267/221, 64.16, 267/218, 64.28, 64.26; 280/6.157, 124.162, 124.157; 188/322.21, 322.17

[56] References Cited

U.S. PATENT DOCUMENTS

| | | | |
|---|---|---|---|
| 3,179,401 | 4/1965 | Bartram | 267/64.17 |
| 3,376,032 | 4/1968 | Schmid | 267/218 |
| 3,598,422 | 8/1971 | Strauff . | |
| 3,788,433 | 1/1974 | Katsumori | 188/314 |
| 4,145,036 | 3/1979 | Moonen | 267/221 |
| 4,166,523 | 9/1979 | Fujii | 188/322.17 |
| 5,248,131 | 9/1993 | Jobelius | 267/64.26 |

FOREIGN PATENT DOCUMENTS

| | | | |
|---|---|---|---|
| 0 281 173 | 9/1988 | European Pat. Off. . | |
| 0868393 | 10/1953 | Germany | 188/322.17 |
| 2092262A | 8/1982 | United Kingdom | 188/322.17 |

*Primary Examiner*—Robert J. Oberleitner
*Assistant Examiner*—Hargobind S. Sawhney
*Attorney, Agent, or Firm*—Klaus J. Bach

[57] ABSTRACT

In an apparatus for the height-adjustable support of a vehicle body wherein each wheel suspension includes a control device with a piston and cylinder unit to which fluid under pressure is supplied, each piston and cylinder unit includes a hollow piston rod with a cylindrical wall having a flange rigidly connected to the vehicle body, a cylinder extending over the piston rod and having a spring carrier formed at its end on which a vehicle support spring is seated and which is movable along the piston rod when pressurized fluid is admitted to the interior of the piston rod for height-adjustment of the vehicle body.

5 Claims, 1 Drawing Sheet

APPARATUS FOR THE HEIGHT-ADJUSTABLE SUPPORT OF A WHEEL OR AN AXLE ON A VEHICLE BODY

BACKGROUND OF THE INVENTION

The invention resides in an apparatus for the height-adjustable support of a wheel or an axle spring suspension on a vehicle body wherein a body-mounted spring support structure includes a cylinder piston unit by which a spring seat is slidably supported so that it can be extended under the control of a control member to which control fluid is supplied by a fluid supply pump.

EP 0 281 173 B1 discloses such a vehicle suspension with height adjustment capabilities. The arrangement disclosed therein is utilized in connection with a suspension system which includes two parallel spring elements. The spring elements are two coil springs arranged concentrically within one another. The cylinder-piston unit supports, by way of the hydraulically extendable spring support, only the inner coil spring. By the tensioning of this coil spring however, the characteristic spring curve of the suspension is changed among other characteristics.

The cylinder of the cylinder-piston-unit is mounted on the vehicle body. The spring is engaged by a piston-operated spring carrier cup. The spring carrier includes a sleeve which is disposed around, and sliding along, the cylinder. As a result, several seal and guide structures need to be arranged between the piston and cylinder as well as between the cylinder and the sleeve of which however only one is exposed to the pressurized fluid and is lubricated thereby.

It is an object of the present invention to provide an apparatus which actively prevents excessive spring strokes of particular wheels or axle portions in a simple manner. The apparatus must require only little space and few building components which are subjected to only little wear. Further, the apparatus is to be easily installed in motor vehicles and it should be possible to install it as after-market device without a need for changing the standard vehicles suspension and/or shock absorber system.

SUMMARY OF THE INVENTION

In an apparatus for the height-adjustable support of a vehicle body wherein each wheel suspension includes a control device with a piston and cylinder unit to which fluid under pressure is supplied, each piston and cylinder unit includes a hollow piston rod with a cylindrical wall having a flange rigidly connected to the vehicle body, a cylinder extending over the piston rod and having a spring carrier formed at its end on which a vehicle support spring is seated and which is movable along the piston rod when pressurized fluid is admitted to the interior of the piston rod for height-adjustment of the vehicle body.

The cylinder of the control device is arranged in the interior suspension so that it does not take up any space which is otherwise usable. The suspension may comprise a single coil spring or a combination of various coil springs and/or a combination of coil and rubber springs. All the spring elements are supported on the body spring support structure. The body spring support structure, which is for example a flange, has a small height in the direction of spring travel. As a result, the ground clearance and the neutral position of the wheel support and guide links do not essentially change if the height adjustable spring support structure is retrofitted in a vehicle or is installed as an option. The outer diameter of the flange may even be smaller than the inner diameter of the spring so that it is disposed fully within the spring support member of the spring support structure whereby, in the rest position of the height control member, the backside of the spring support member can be disposed closely adjacent the vehicle body.

The spring support structure is provided with a coating in the areas in which it comes into contact with the support flange or the vehicle body. The coating consists of an elastic non-metallic material which provides for noise insulation and protects from friction corrosion.

In order to need the least possible amount of sealing elements in the control member and to provide for guide structures which are always lubricated the space between the cylinder and the piston rod is in flow communication with a lubricant containing cavity in the piston rod by way of at least one bore.

The control member is supplied with hydraulic fluid by the power steering pump of the motor vehicle. In this way, there is no need for a separate pump and a control arrangement therefor and the space that would be needed for such a pump is also saved. In addition, the retrofit expenses are greatly reduced.

Details of the invention will become apparent from the following description thereof on the basis of the accompanying drawings.

BRIEF DESCRIPTION OF THE DRAWINGS

The sole FIGURE is a partial cross-sectional view of an apparatus for the height-adjustable support of a wheel or an axle on a vehicle body.

DESCRIPTION OF A PREFERRED EMBODIMENT

Figure 1:
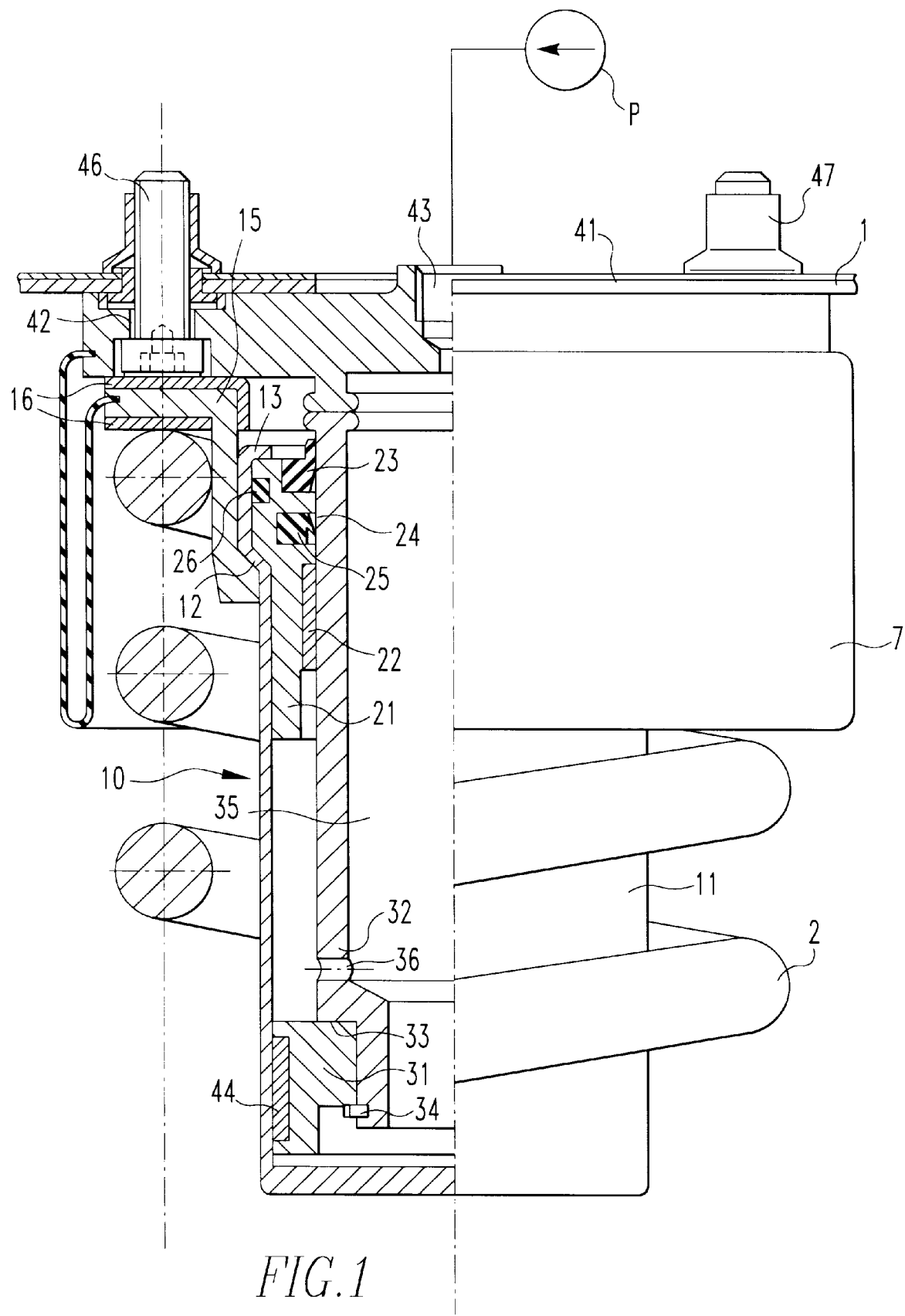

The apparatus as shown in FIG. 1 comprises a control device 10 disposed between a wheel and axle suspension, that is, the spring 2 and the body 1 of a motor vehicle. The control device 10 comprises essentially a piston 31 and a cylinder 11.

The piston 31 is connected to the vehicle body 1 by way of a piston rod 32 and a flange 41. The piston 31 has an annular shape and is disposed at the bottom end of the piston rod 37 which is hollow and has a recess formed at its bottom end to provide a shoulder 33 accommodating the annular piston 31. When hydraulic fluid under pressure is admitted to the control device 10 the piston 31 is firmly seated on the shoulder 33. It is held in position by a spring clip 34 which is received in a groove extending around the piston rod 32.

The piston rod 32 is firmly attached to the plate-like flange 41 for example by a friction weld. The flange 41 has a diameter which is for example slightly larger than the outer diameter of the coil spring 2 used in the arrangement of FIG. 1. It includes at its circumference several bores 42 with recesses formed in accordance with DIN 74, form J (=standardized form for such recesses). The recesses facilitate the mounting of the flange 41 on the vehicle chassis 1 by means of cylindrical flat-head bolts 46 according to DIN 6912. At the side adjacent the vehicle body 1, the flange 41 is also provided with recesses. They form cavities for receiving so-called pegnuts 47. The pegnuts are internally threaded sleeves which are loosely threaded onto the bolts 46 extending through the flange 41. For attaching the flange 41 to the vehicle body 1, the flange with the pegnuts and the bolts is placed onto the body 1 such that the pegnuts 47 with bolts 46 extend through appropriate bores in a wall of the body 1. When the bolts 46, are then tightened the pegnuts 47 expand behind the body wall bores forming a force and form fitting connection.

The type of bolts and the relatively small thickness of the flange 41 provide for a building height for the control device 10 which is in the area of the length tolerance of commercially available vehicle coil springs. The type of nuts 47 used permits the mounting of the control device 10 from the bottom of the vehicle. Both features are important for retrofitting a motor vehicle easily without the replacement of the springs and/or shock absorbers.

Furthermore, the flange 41 has a central threaded hydraulic fluid supply passage 43 wherein the hydraulic fluid supply line 43' is mounted.

The cylinder 11 of the control device 10 is a thin-walled sleeve which is cylindrical in its operational section and which is provided with a flat bottom wall. At its open end, it is provided with a piston rod seal structure 21. To accommodate the piston rod seal structure 21, the cylinder 11 is widened at its open end. Between the widened seal area and the operating portion, the cylinder 11 has a truncated cone-like shoulder 12 on which the piston rod seal structure 21 is disposed. It is held in engagement with the cone-like shoulder 12 by a bent-over rim 13 of the cylinder 11. An O-ring 26 is arranged in the gap between the cylinder 11 and the piston rod seal structure 21.

Adjacent the piston rod 32, the piston rod seal structure 21 includes three grooves or annular recesses. The first upper groove receives a seal ring 23 for wiping off contaminants. The second groove below the upper groove includes a pressurized fluid seal 24 which is held in engagement with the surface of the piston rod 32 by an O-ring 25 disposed in the base of the second groove. The third, lower groove receives an annular cylinder guide element 22 consisting of a wear and pressure resistant plastic material such as PTFE.

A similar guide element 44 is disposed in a groove formed in the cylindrical outer circumference of the piston 31.

A bore 36 extends laterally through the side wall of the piston rod 32. It provides for communication between the space 25 within the piston rod 32 and the annular space between the cylinder 11 and the piston rod 32. With this arrangement, the effective piston surface is on one hand reduced by the front surface area of the piston rod seal structure 21 but, on the other hand, the pressure seal for the pressurized fluid is transferred to the piston rod seal structure 21. As a result, on one hand, the seal receiving groove is narrower and, on the other hand, both guide elements 22, 44 are exposed to the pressurized fluid and are lubricated thereby.

The spring carrier 15 has the shape of a tube flange. The tubular section of the spring carrier 15 is disposed adjacent the truncated cone-like shoulder 12 of the cylinder 11. The planar flange-like section of the spring carrier 15 forms on one side the support for the coil spring 2 and it forms on the opposite side a seating surface supported on the flange 41, when the control device 10 is in its rest position. The planar flange-like section is provided at both sides with an elastic plastic coating 16.

A boot 7 is mounted on the flange 4 and the spring carrier 15 to protect the piston rod 32 from road dirt and corrosion.

During assembly of the control device 10, the piston rod seal structure 21 is pushed onto the piston 31 and the annular piston 31 is placed onto the end of the piston rod 32 where it is secured in position. Then the cylinder 11 is placed in position over the piston 31 and the piston rod seal structure 21 carried thereby. Subsequently, the end of the cylinder 11 is bent over to form an inwardly extending rim 13 engaging the piston rod seal structure 21 and the spring carrier 15 is disposed or pressed onto the cylinder 11.

For operation of the apparatus in a motor vehicle the control device 10 is connected to the hydraulic power steering pump. It is possible to use the power steering pump for this purpose since, in contrast to the usual vehicle level control arrangements the present system is not in constant use but is used very little, that is, only to make adjustments for excessive vehicle loads during emergency braking or when negotiating a narrow curve. In all cases, the vehicle body with regard to the vehicle support surface is maintained at a desired level by a control arrangement by which the cylinder 11 and the spring carrier are moved so as to compensate for excessive movement of the wheel or rather wheel suspensions.

With the apparatus according to the invention the vehicle under-body is also protected from damages as it prevents contact of the vehicle under-body structures with the ground which might otherwise occur with heavy loads and wallow movements of the vehicle.

For example to compensate for a load increase, the control devices are supplied by a fluid pump P with pressurized fluid by way of electrically operable check valves until the vehicle body has reached a normal position. The pressure remains unchanged in the various control devices as long as the vehicle carries the particular load, only when the vehicle body is lifted the next time excessively off the ground that is when its load is reduced the check valves are electrically opened so that the control devices return to a position corresponding to the respective load or all the way back to their rest position.

What is claimed is:

1. An apparatus for the height-adjustable support of a wheel or an axle spring structure on a vehicle body, comprising for each spring structure a control device with a piston and cylinder unit to which fluid under pressure is supplied from a fluid pressure source for adjustably supporting each spring structure, each said piston and cylinder unit including a hollow piston rod with a cylindrical wall having a flange rigidly connected to said vehicle body, a cylinder including a sleeve extending over the cylindrical wall of said piston rod and being provided at its end with a spring carrier on which said spring structure is seated and which itself is seated on said flange when said control device is in a rest position, a piston rod seal structure retained at one end of said sleeve by a bent-over rim portion of said sleeve, and, adjacent said seal structure at said one end, a guide element and, at its other end, an annular piston which is provided at its outer circumference with a guide structure for slideably supporting said sleeve during relative axial movement between said cylinder and said piston, said piston rod including a bore providing for communication of the interior of said piston rod with the annular space disposed between said piston rod and said sleeve and extending axially between said guide elements.

2. An apparatus according to claim 1, wherein said flange and said spring carrier are thin plate structures of only small construction height in the axial direction of movement of said spring.

3. An apparatus according to claim 1, wherein said piston rod includes a cavity extending over its full length.

4. An apparatus according to claim 1, wherein said spring carrier is provided with an elastic coating of plastic material in the areas in which it comes into contact with said flange and said spring.

5. An apparatus according to claim 1, wherein said flange includes a fluid supply passage for supplying fluid under pressure from a vehicle power steering pump to the interior of said piston rod.

* * * * *